United States Patent [19]

Hishikawa et al.

[11] Patent Number: 5,157,566
[45] Date of Patent: Oct. 20, 1992

[54] MAGNETIC DISK DRIVE HAVING A LOCK MECHANISM FOR PREVENTING ROTATION OF A DISK SPINDLE AFTER THE DISK SPINDLE IS STOPPED

[75] Inventors: Tetsuyuki Hishikawa; Yoshiji Kitamura, both of Tokyo, Japan

[73] Assignee: NEC Corporation, Tokyo, Japan

[21] Appl. No.: 560,638

[22] Filed: Jul. 31, 1990

[30] Foreign Application Priority Data

Jul. 31, 1989 [JP] Japan .................. 1-90202[U]

[51] Int. Cl.⁵ .................. G11B 17/02; G11B 5/54; G11B 21/22
[52] U.S. Cl. .................. 360/99.08; 360/98.07; 360/105; 369/268
[58] Field of Search ............... 360/98.01, 97.01, 99.04, 360/99.08, 98.07, 75, 69, 71, 105; 369/268

[56] References Cited

U.S. PATENT DOCUMENTS

| | | | |
|---|---|---|---|
| 2,881,264 | 4/1959 | Kobler | 369/268 |
| 3,936,056 | 2/1976 | Breyfogle, III et al. | 369/268 |
| 4,135,721 | 1/1979 | Camerik | 369/268 |
| 4,331,989 | 5/1982 | Viskochil | 360/99.08 |
| 4,365,326 | 12/1982 | Ohsawa et al. | 369/268 X |
| 4,366,554 | 9/1989 | Stupeck et al. | 360/75 |
| 4,417,288 | 11/1983 | Hattori et al. | 369/268 |
| 4,484,291 | 11/1984 | Brende et al. | 360/105 X |
| 4,497,002 | 1/1985 | von der Heide et al. | 369/268 |
| 4,807,071 | 2/1989 | Kosaka et al. | 360/75 |
| 4,831,469 | 5/1989 | Hanson et al. | 360/75 X |
| 4,897,743 | 1/1990 | Kohno | 360/75 X |
| 4,979,062 | 12/1990 | Stefansky | 360/97.02 |
| 5,019,932 | 5/1991 | Iwata | 360/105 |

FOREIGN PATENT DOCUMENTS

| | | | |
|---|---|---|---|
| 56-105362 | 8/1981 | Japan | 369/268 |
| 56-105363 | 8/1981 | Japan | 369/268 |
| 1204270 | 9/1989 | Japan | 364/268 |
| 2105375 | 4/1990 | Japan | 360/104 |

*Primary Examiner*—David J. Severin
*Assistant Examiner*—Alfonso Garcia
*Attorney, Agent, or Firm*—Sughrue, Mion, Zinn, Macpeak & Seas

[57] ABSTRACT

A magnetic disk drive includes a spindle for rotating a plurality of magnetic disks and a lock mechanism for preventing the spindle from rotating when the magnetic disk drive is not operated. A toothed disk is provided on an axial end of the spindle, and a movable lock arm engageable to teeth of the toothed disk is provided. The lock arm is driven to lock the rotation of the spindle by a solenoid which is energized after a predetermined period of time has elapsed after the electric power of the disk drive is turned off, so that the lock mechanism locks the spindle after the rotation of the spindle and magnetic disks completely stop.

4 Claims, 3 Drawing Sheets

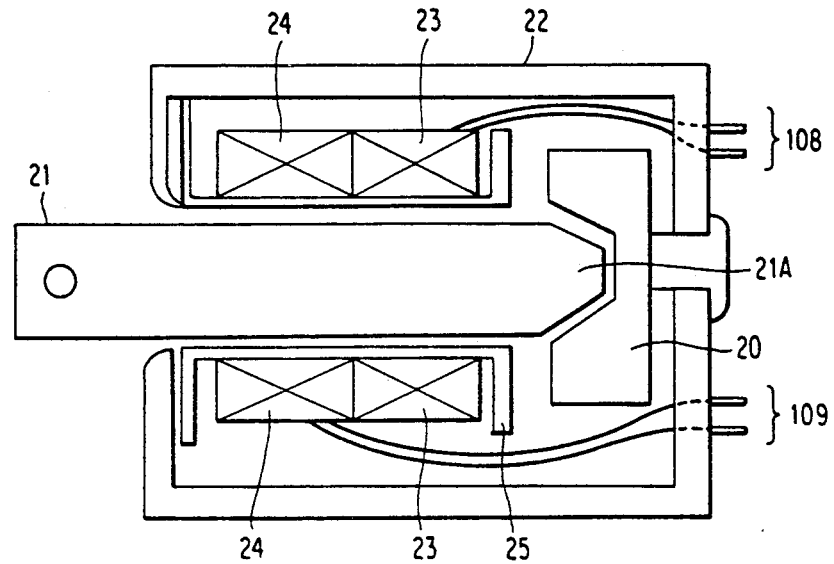
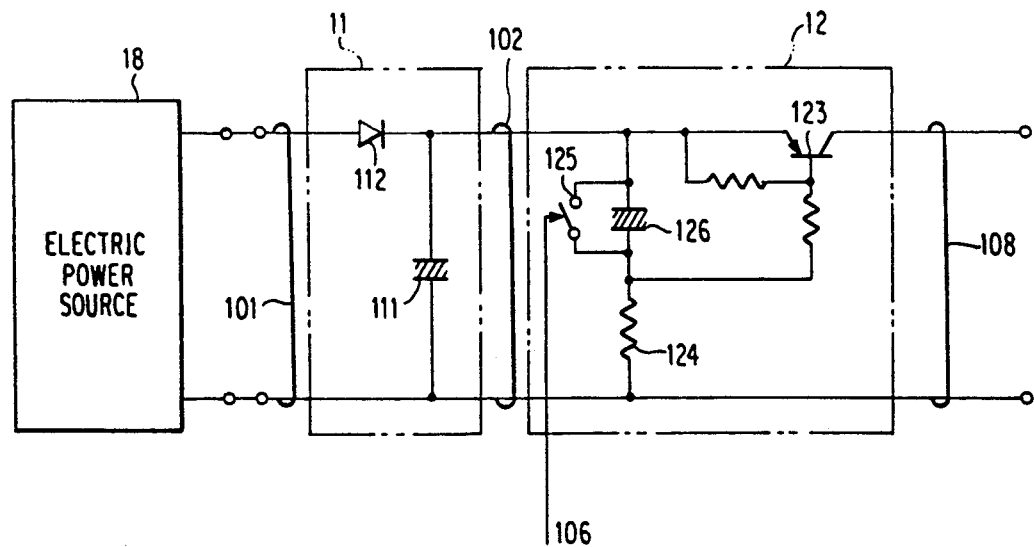

MAGNETIC DISK DRIVE HAVING A LOCK MECHANISM FOR PREVENTING ROTATION OF A DISK SPINDLE AFTER THE DISK SPINDLE IS STOPPED

BACKGROUND OF THE INVENTION

The present invention relates to a lock mechanism for preventing rotation of a spindle on which a plurality of magnetic disks are coaxially provided.

A magnetic disk drive has a plurality of magnetic disks coaxially provided on a spindle which is rotated by a spindle motor. The magnetic disk drive also has a head carriage for driving a plurality of magnetic heads, each of which is provided for carrying out read and write operations to a respective surface of the magnetic disks, in a radial direction of the magnetic disks. The magnetic disks, spindle, head carriage, and magnetic heads are generally in a sealed enclosure to form a head-disk assembly.

In the read and write operations, the magnetic disks are rotated together with the spindle causing each of the magnetic heads to fly on the respective surface of the magnetic disks with a fine clearance owing to the air bearing effect. On the other hand, the magnetic heads are in contact with the respective disk surfaces when the magnetic disks are not rotated, i.e., while the disk drive is not operated or while the disk drive is shipped. It is preferable to prevent the rotation of the spindle to reduce the occurrence of damage to the magnetic heads and disk surfaces, when the magnetic disks are not rotated.

To this end, a conventional lock mechanism for preventing rotation of a spindle is disclosed in U.S. Pat. No. 4,331,989, which issued to Viskochil on May 25, 1982. The conventional lock mechanism includes a lock arm one end of which is provided with a brake pad for engagement with the spindle. The lock arm is connected to a lever which is manually operated to first and second positions for locking and unlocking the rotation of the spindle, respectively.

The locking operation should be carried out after the rotation of the magnetic disk completely stops because the magnetic head tends to clash with the disk surface if the rotational speed of the disk is suddenly decreased. The conventional lock mechanism has a disadvantage in that an operator must confirm the complete stop of the rotation of the disk before the locking operation.

The Viskochil patent also suggests an electrically operable lock mechanism including a linear solenoid; however, no arrangement for energizing the lock mechanism after the complete stop of the disk rotation is disclosed or suggested in the Viskochil patent.

SUMMARY OF THE INVENTION

Therefore, an object of the present invention is to provide a magnetic disk drive including a lock mechanism for preventing rotation of a spindle and being automatically actuated after the rotation of the spindle stops.

Another object of the present invention is to provide a magnetic disk drive capable of reducing the possibility that a magnetic head clashes with a disk surface when a lock mechanism for preventing rotation of a spindle is actuated.

Still another object of the present invention is to provide a magnetic disk drive including a spindle lock mechanism controllable by a simple control circuit.

A magnetic disk drive according to the present invention comprises a spindle coaxially provided with at least one magnetic disk; power source means for supplying electric power causing the spindle to rotate: friction means provided on one axial end of the spindle; lock means movably provided to take first and second positions where the lock means engage and disengage the friction means so as to prevent and permit rotation of said spindle, respectively: and driving means for driving the lock means from the second position to the first position when a predetermined time period has elapsed after the power source means ceases to supply the electric power.

BRIEF DESCRIPTION OF THE DRAWINGS

FIG. 3 is a sectional view showing a solenoid assembly used in the embodiment of the present invention shown in FIG. 2.

FIG. 5 is a circuit diagram showing an embodiment of a drive-out coil power supply circuit and drive-out coil control circuit used in the control circuit shown in FIG. 4.

DETAILED DESCRIPTION OF THE PREFERRED EMBODIMENT

Figure 1:
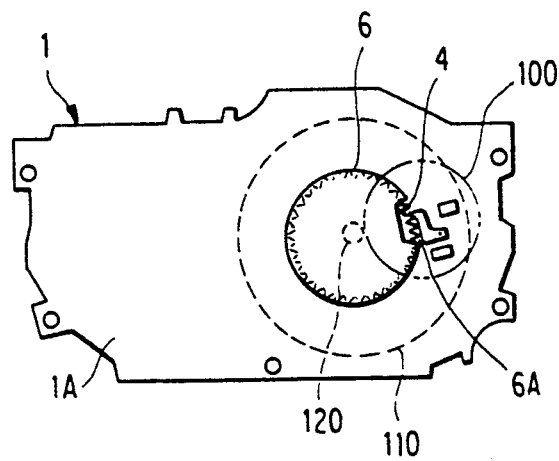
FIG. 1 is a plan view showing an embodiment of the present invention.

FIG. 1 shows a head-disk assembly 1 which includes a lock mechanism 100 according to an embodiment of the present invention. The head-disk assembly 1 has a plurality of magnetic disks 110 coaxially provided on a spindle 120 which is rotated by a spindle motor (not shown). The magnetic disks 110 are enclosed in an enclosure 1A and one end of the spindle 120 is extended outside of the enclosure 1A. A toothed disk 4 is fixedly and coaxially attached, as friction means, to the extended end of the spindle 120 so as to be located outside of the enclosure 1A. A spindle cover 6, having an opening 6A, is attached on the enclosure 1A to cover the toothed disk 4.

Figure 2:
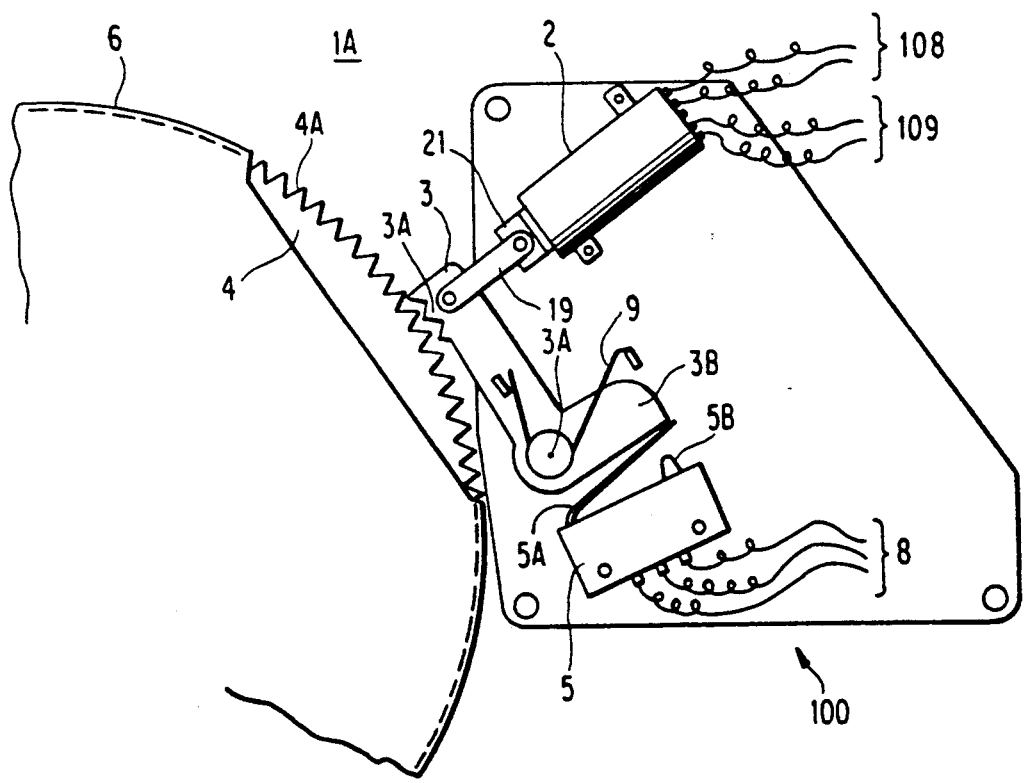
FIG. 2 is an elongated plan view showing a lock mechanism used in the embodiment of the present invention shown in FIG. 1.

Referring to FIG. 2, the lock mechanism 100 includes a solenoid 2 whose armature 21 is driven out and in corresponding to a drive-out and drive-in signal supplied via signal lines 108 and 109, respectively. The armature 21 is connected to an L-shaped lock arm 3, which is rotatably provided around an axis 3A, via a link 19. The lock arm 3 is urged in a counterclockwise direction by a spring 9. One end of the lock arm 3 has teeth 3A for engaging teeth 4A formed around a circumference of the toothed disk 4; and the other end 3B thereof is opposed to a leaf spring 5A of a switch 5 for detecting the position of the lock arm 3. The detection switch 5 has a switching element 5B depressed by the leaf spring 5A when the lock arm 3 is rotated in a clockwise direction, ON and OFF states of the switching element 5B are supplied through sense signal lines 8.

Referring to FIG. 3, the solenoid 2 includes a permanent magnet 20 opposing an inside end 21A of the armature 21 for attracting and holding the armature 21 into a solenoid housing 22. The solenoid 2 further has a drive-out coil 23 and a drive-in coil 24 connected to the drive-out signal line 108 and drive-in signal line 109, respectively. The coils 23 and 24 are wound around a coil bobbin 25 in the reverse turn direction to each other.

Referring back to FIG. 2, the armature 21 of the solenoid 2 is ejected by the spring 9 through the arm 3 and link 19. The teeth 3A of the arm 3 engage the teeth 4A of the disk 4 so as to prevent the rotation of the spindle 120 and magnetic disks 110. In this state, neither the drive-out coil 23 nor the drive-in coil 24 is energized.

When the drive-in signal is supplied to the drive-in coil 24 through the signal lines 109, the coil 24 generates a magnetic force applied to the armature 21 in the rightward direction in FIG. 3 so that the armature 21 is driven rightward against the force of the spring 9. When the inside end 21A of the armature 21 approaches the magnet 20 at a predetermined distance, the magnet 20 attracts the armature 21 to a drive-in position. The magnet 20 has a magnetic force strong enough to hold the armature 21 at the drive-in position against the spring 9 even after the energization of the drive-in coil 24 is terminated.

In this state, the lock arm 3 is rotated in the clockwise direction so that the teeth 3A disengage the teeth 4A of the disk 4. Therefore, the rotation of the spindle 120 and magnetic disks 110 is permitted. At the same time, the end 3B of the arm 3 pushes the switching element 5B through the leaf spring 5A. The ON-state of the switch 5 is sent out through the signal lines 8 to indicate that the spindle 120 is in an unlocked condition. The energization of the drive-in coil 24 is stopped when the armature 21 is in the drive-in position The armature 21 is maintained in the drive-in position until the drive-out signal is supplied to the drive-out coil 23.

When the drive-out signal is supplied to the coil 23 through the signal line 108, the coil 23 generates a magnetic force applied to the armature 21 in the leftward direction in FIG. 3 so that the armature 21 is driven leftward against the magnetic force of the magnet 20. In other words, the magnetic force generated by the coil 23 cancel the magnetic force generated by the magnet 20. The armature 21 is ejected from the housing 22, moving the link 19 and arm 3, which movement is aided by the spring 9 to cause arm 3 to be in a drive-out position as shown in FIG. 2. The spring 9 has a force strong enough to hold the armature 21 at the drive-out position against the magnetic force of the magnet 20 when the inside end 21A is apart from the magnet 20 even after the energization of the coil 23 is terminated.

In this state, the lock arm 3 is driven in the counterclockwise direction so that the teeth 3A engage the teeth 4A of the disk 4. Therefore, the rotation of the spindle 120 and magnetic disks 110 is prevented. At the same time, the end 3B of the arm 3 is apart from the switching element 5B. The OFF-state of the switch 5 is sent out through the signal lines 8 to indicate that the spindle 120 is in a locked condition. The energization of the drive-out coil 23 is stopped when the armature 21 is in the drive-out position. The armature 21 is maintained in the drive-out position until the drive-in signal is supplied to the drive-in coil 24.

Thus, the movement of the armature 21 is triggered by the energization of the drive-out or drive-in coil 23 or 24, and the holding of the armature 21 in the drive-out or drive-in position is carried out by the spring 9 or the permanent magnet 20.

Figure 4:
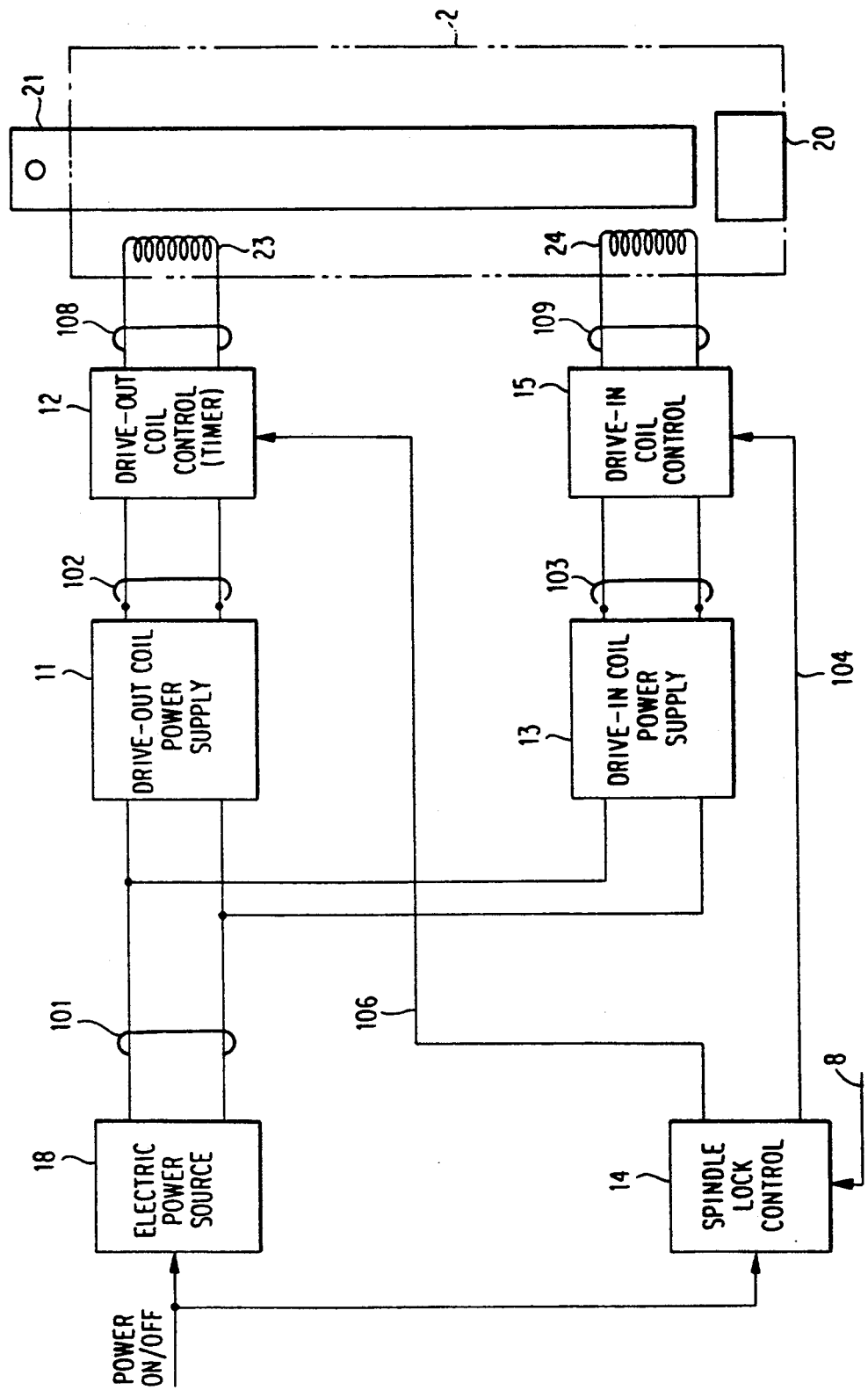
FIG. 4 is a block diagram showing a control circuit used for controlling the embodiment of the present invention shown in FIG. 2.

A control circuit for the lock mechanism 100 will now be described with reference to FIG. 4.

The control circuit includes a drive-out coil control circuit 12 and drive-in coil control circuit 15 for energizing the drive-out coil 23 and drive-in coil 24 via the signal lines 108 and 109, respectively. The drive-out coil control circuit 12 is supplied with a drive-out current from a drive-out coil power supply circuit 11 via power supply lines 102. The control circuit 12 is also supplied with a drive-out coil activate signal 106 from a spindle lock control circuit 14 so as to supply the drive-out current, as the drive-out signal, to the drive-out coil 23 after a predetermined time period has elapsed since receiving the activate signal 106 (therefore, the control circuit 12 can be referred to "timer circuit"). The drive-in coil control circuit 15 is supplied with a drive-in current from a drive-in coil power supply circuit 13 via power supply lines 103 so as to supply the drive-in current, as the drive-in signal, to the drive-in coil 24 in response to a drive-in coil activate signal 104 generated by the control circuit 14.

The spindle lock control circuit 14 generates the drive-in coil activate signal 104 when the electric power of the head-disk assembly 1 is turned on, and stops generating the activate signal 104 when the detection switch 5 goes to the "ON" state which produces the sense signals 8 to inform the control circuit 14 of the "ON" state. The control circuit 14 also generates the drive-out coil active signal 106 when the electric power of the head-disk assembly 1 is turned off. An electric power source 18 supplies electric power to the power supply circuits 11 and 13, the spindle motor, and the other parts of the head-disk assembly 1 while the electric power of the head-disk assembly 1 is turned on. It is to be understood that power supply circuit 11 may be constructed as a charge storage circuit to supply stored power to drive-out coil control circuit 12 after the electric power source 18 has been turned off.

The description of the operation of the lock mechanism will begin with the condition where the electric power of the head-disk assembly 1 is turned off, i.e., when the assembly 1 is not operated or being shipped, and where the teeth 3A of the lock arm 3 engage the teeth 4A of the disk 4 so as not to rotate the spindle 120.

When the electric power of the assembly 1 is turned on, the spindle lock control circuit 14 send the activate signal 104 to the drive-in coil control circuit 15. The control circuit 15 immediately responds to supply the drive-in signal to drive-in coil 24. The magnetic force generated by the coil 24 causes the armature 21 of the solenoid 2 to move into the housing 22. The magnet 20 then attracts the end 21A and holds the armature 21 in the drive-in position. The attraction of the armature 21 to the drive-in position causes the lock arm 3 to rotate and to disengage from the disk 4 so that the spindle 120 can be rotated by a spindle motor to carry out the read/write operations.

The rotation of the lock arm 3 in the clockwise direction is detected by the switch 5. The lock control circuit 14 stops supplying the activate signal 104 in response to the sense signal 8 so that the control circuit 15 ceases the energization of the coil 24. Since the magnet 20 keeps on attracting the armature 21 in the drive-in position, the spindle 120 maintains the unlocked condition.

When the electric power of the assembly 1 is turned off, the spindle lock control circuit 14 sends the drive-out coil activate signal 106 to the drive-out coil control circuit 12 while the spindle 120 and magnetic disks 110 keep on rotating owing to inertia. In this embodiment, the spindle 120 and disks 110 keep on rotating about 30 seconds after the electric power is turned off. The control circuit 12 supplies the drive-out current stored in the power supply circuit 11 to the drive-out coil 23 after 30 seconds or more has elapsed since generation of the active signal 106. That is, the coil 23 is energized after the rotation of the spindle 120 and disks 110 completely stops. The magnetic force generated by the coil 23 causes the armature 21 to move apart from the magnet 20. The armature 21 is then projected by the spring 9 so that the teeth 3A of the lock arm 3 engage the teeth 4A of the toothed disk 4. As a result, the rotation of the spindle 120 is prevented. Even after the stored electric power in the power supply circuit 11 is exhausted by the coil 23, the projection of the armature 21, i.e., the locked condition of the spindle 120, is maintained by the spring 9.

FIG. 5 shows an embodiment of the drive-out coil power supply circuit 11 and drive-out coil control circuit 12.

The power supply circuit 11 includes a condenser 111 having a parallel connection with the supply lines 101 and a diode 112 having a serial connection with the supply lines 101 as illustrated. The control circuit 12 includes a relay switch 125 operable by the drive-out coil activate signal 106, a resister 124 and condenser 126 having a parallel connection with the supply lines 102 and a transistor 123 whose emitter and collector are connected to the supply line 102 and signal line 108 and whose base is connected between the resister 124 and condenser 126.

When the electric power of the head-disk assembly 1 is turned on, i.e., when the power source 18 supplies power, the relay switch 125 is closed. The condenser 111 charges, but the condenser 126 does not charge and the transistor 123 is "OFF". Therefore, the drive-out signal is not supplied, via the lines 108, to the drive-out coil 23.

When the electric power is turned off, the activate signal 106 makes the relay switch open. The condenser 111 begins to discharge and the condenser 126 begins to charge. When the voltage between the base and emitter of the transistor 123 becomes more than 0.6 volt, the transistor 123 becomes "ON" and the electric power stored in the condenser 111 is supplied to the coil 23, as the drive-out signal, via the lines 108.

The time period after the activate signal 106 is supplied until the transistor 123 becomes "ON" is determined by the time constant of the resister 124 and condenser 126 which form a "CR-timer". The time constant of the "CR-timer" is made equal to or more than 30 seconds, which is the rotating time period of the spindle 120 due to the inertia.

In this embodiment, the control circuit 12 includes a timer having the resister 124, condenser 126 and transistor 123. However, a digital counter can be used as the timer.

As described above, the present invention makes it possible to automatically carry out the lock operation of the spindle after a predetermined time period has elapsed after the electric power of the head disk assembly is turned off. As a result, damage to the head and magnetic disk due to the lock operation can be reduced.

What is claimed is:

1. A magnetic disk drive comprising:

a spindle coaxially provided with a plurality of magnetic disks;
a power source for supplying electric power causing said spindle to rotate;
a toothed disk fixed on one axial end of said spindle;
a lock arm movably provided opposing said toothed disk, said lock arm including a toothed end engaging said toothed disk when said lock arm is in a first position to prevent said spindle from rotating and disengaging said toothed disk when said lock arm is in a position to permit said spindle to rotate;
a spring for urging said lock arm into said first position;
a solenoid including an armature connected to said lock arm and assuming taking drive-out and drive-in positions to cause said lock arm to be in said first and second positions, respectively, said solenoid further including a permanent magnet for attracting said armature into said drive-in position, a drive-out coil for driving said armature from said drive-in position to said rive-out position against the attracting force of said permanent magnet, and a drive-in coil for driving said armature from said drive-out position to said drive-in position against the urging force of said spring;
a spindle lock controller for controlling the operation of said solenoid, said spindle lock controller energizing said drive-in coil when said power source starts to supply said electric power and generating an activate signal when said power source ceases to supply said electric power; and
a drive-out coil controller connected to said spindle lock controller for energizing said drive-out coil when a predetermined time period has elapsed after receiving said active signal, said predetermined time period being determined by a time period while said spindle and said magnetic disks are rotated by their inertia after said power source cease to supply said electric power.

2. The magnetic disk drive as claimed in claim 1, further comprising a drive-out coil power supply circuit connect to said power source and said drive-out coil controller for storing said electric power while said power source supplies said electric power, and for supplying the stored electric power to said drive-out coil controller for energizing to said drive-out coil.

3. A spindle lock mechanism comprising:

a spindle;
a power source for supplying electric power causing said spindle to rotate;
a toothed disk fixed on one axial end of said spindle;
a lock arm movably provided opposing said toothed disk, said lock arm including a toothed end engaging said toothed disk when said lock arm is in a first position to prevent said spindle from rotating and disengaging said toothed disk when said lock arm is in a second position to permit said spindle to rotate;
a spring for urging said lock arm into said first position;
a solenoid including an armature connected to said lock arm and assuming taking drive-out and drive-in positions to cause said lock arm to be in said first and second positions, respectively, said solenoid further including a permanent magnet for attracting said armature into said drive-in position, a drive-out coil for driving said armature form said drive-in position to said drive-out position against the attracting force of said permanent magnet, and a drive-in coil for driving said armature from said drive-out position to said drive-in position against the urging force of said spring;

a spindle lock controller for controlling the operation of said solenoid, said spindle lock controller energizing said drive-in coil when said power source starts to supply said electric power and generating an active signal when said power supply ceases to supply said electric power; and a drive-out coil controller connected to said spindle lock controller for energizing said drive-out coil when a predetermined time period has elapsed after receiving said active signal, said predetermined time period being determined by a time period while said spindle is rotated by its inertia after said power source ceases to supply said electric power.

4. The spindle lock mechanism as claimed in claim 3, wherein said spindle is coaxially provided with a plurality of magnetic disks.

* * * * *